(12) United States Patent
Kawai et al.

(10) Patent No.: US 10,892,108 B2
(45) Date of Patent: Jan. 12, 2021

(54) ELECTROCHEMICAL DEVICE

(71) Applicant: TAIYO YUDEN CO., LTD., Tokyo (JP)

(72) Inventors: Yuki Kawai, Takasaki (JP); Koji Kano, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 0 days.

(21) Appl. No.: 15/934,802

(22) Filed: Mar. 23, 2018

(65) Prior Publication Data
US 2018/0286597 A1    Oct. 4, 2018

(30) Foreign Application Priority Data

Mar. 28, 2017 (JP) .................. 2017-062345

(51) Int. Cl.
*H01G 11/06* (2013.01)
*H01G 11/50* (2013.01)
(Continued)

(52) U.S. Cl.
CPC ............ *H01G 11/06* (2013.01); *H01G 11/24* (2013.01); *H01G 11/26* (2013.01); *H01G 11/50* (2013.01);
(Continued)

(58) Field of Classification Search
None
See application file for complete search history.

(56) References Cited

U.S. PATENT DOCUMENTS 8,815,451 B2   8/2014 Wada et al.
9,496,584 B2  11/2016 Taguchi et al.
(Continued)

FOREIGN PATENT DOCUMENTS

CN   102301439 A   12/2011
CN   102379017 A    3/2012
(Continued)

OTHER PUBLICATIONS

Ueki et al., JP2008060130A Espacenet translation (Year: 2008).*
(Continued)

*Primary Examiner* — Jonathan G Jelsma
*Assistant Examiner* — Kirsten B Tysl
(74) *Attorney, Agent, or Firm* — Law Office of Katsuhiro Arai

(57) ABSTRACT

An electrochemical device has a positive electrode, a negative electrode, separators, and an electrolyte. The negative electrode has a first and second negative-electrode active-material layers and a negative-electrode collector which has (i) a first principal face on which the first negative-electrode active-material layer is formed, and (ii) a second principal face having a coated area where the second negative-electrode active-material layer is formed, and an uncoated area where no second negative-electrode active-material layer is formed. The negative-electrode collector has multiple through holes that interconnect the first and second principal faces wherein the boundary of the coated area and the uncoated area intersects the opening of at least one of the multiple through holes. The electrochemical device is such that a metallic lithium is electrically connected to the uncoated area and immersed in the electrolyte, to allow for pre-doping of the negative-electrode active-material layers with lithium ions.

7 Claims, 15 Drawing Sheets

(51) Int. Cl.
*H01G 11/52* (2013.01)
*H01G 11/24* (2013.01)
*H01G 11/82* (2013.01)
*H01G 11/26* (2013.01)
*H01G 11/70* (2013.01)

(52) U.S. Cl.
CPC ............ *H01G 11/52* (2013.01); *H01G 11/70* (2013.01); *H01G 11/82* (2013.01)

(56) References Cited

U.S. PATENT DOCUMENTS

| | | |
|---|---|---|
| 2011/0236748 A1 | 9/2011 | Nakashima et al. |
| 2011/0256438 A1 | 10/2011 | Taguchi et al. |
| 2012/0045685 A1 | 2/2012 | Seki et al. |
| 2014/0002959 A1* | 1/2014 | Ando ............... H01G 11/22 361/503 |
| 2017/0236656 A1 | 8/2017 | Kano et al. |
| 2018/0286600 A1 | 10/2018 | Kawai et al. |
| 2019/0066934 A1 | 2/2019 | Kano et al. |
| 2019/0067676 A1 | 2/2019 | Nagamitsu et al. |

FOREIGN PATENT DOCUMENTS

| | | | |
|---|---|---|---|
| CN | 103430263 A | | 12/2013 |
| JP | H11283676 A | | 10/1999 |
| JP | 2008060130 A | * | 3/2008 |
| JP | 2009187751 A | | 8/2009 |
| JP | 2010238680 A | | 10/2010 |
| JP | 2010238681 A | | 10/2010 |
| JP | 2011258798 A | | 12/2011 |
| JP | 2012114161 A | | 6/2012 |
| JP | 2014102897 A | | 6/2014 |
| JP | 2017147367 A | | 8/2017 |
| JP | 2018148229 A | | 9/2018 |
| JP | 2018148230 A | | 9/2018 |
| KR | 101207723 B1 | | 12/2012 |
| KR | 1020170019054 A | | 2/2017 |

OTHER PUBLICATIONS

A Notification of Reason for Refusal issued by Korean Intellectual Property Office, dated Apr. 12, 2019, for Korean related application No. 1020180033057. (4 pages).

A First Office Action issued by the State Intellectual Property Office of China dated Aug. 5, 2019 for Chinese counterpart application No. 201810265355.1. (6 pages).

* cited by examiner

FIG. 15

|  | Initial (mΩ) | After 50000 cycles (mΩ) | After 100000 cycles (mΩ) |
|---|---|---|---|
| Example | 30 | 34 | 37 |
| Comparative example 1 | 30 | 37 | Short-circuit |
| Comparative example 2 | 34 | 36 | 46 |

ELECTROCHEMICAL DEVICE

BACKGROUND

Field of the Invention

The present invention relates to an electrochemical device that utilizes lithium ion pre-doping.

Description of the Related Art

Capacitors and other electrochemical devices are utilized, of late, as systems for storing clean energy generated by solar generation, wind generation, etc., and as main power supplies or supplementary power supplies of automobiles, hybrid electric vehicles, and the like. In the above, electric double-layer capacitors provide high output but are low in capacitance, while batteries offer high capacitance but their output is low. Accordingly, lithium ion capacitors whose negative electrode uses a material capable of occluding lithium ions, and which offer higher capacitance than electric double-layer capacitors and longer service life than batteries, are replacing batteries in a growing number of applications.

Among such lithium ion capacitors are the ones described in Patent Literatures 1 and 2, for example, each comprising: an electric storage element constituted by positive electrodes and negative electrodes stacked together alternately with separators in between; a current collector having multiple through holes penetrating the current collector from its front face to back face; and an electrolyte.

BACKGROUND ART LITERATURES

[Patent Literature 1] Japanese Patent Laid-open No. 2010-238680

[Patent Literature 2] Japanese Patent Laid-open No. 2010-238681

SUMMARY

However, the electric storage device electrodes described in Patent Literatures 1 and 2 are constituted in such a way that the boundary of an active-material forming part and an active-material non-forming part is positioned inside a no-through hole area of a porous current collector. This means that, if any such electric storage device electrode is used as a negative electrode, then the negative electrode may expand due to intercalation of lithium ions into the negative electrode, in which case the electric storage element may deform or other problems may occur.

In light of the aforementioned circumstances, an object of the present invention is to provide an electrochemical device that suppresses problems which would otherwise occur due to expansion of the negative electrode.

Any discussion of problems and solutions involved in the related art has been included in this disclosure solely for the purposes of providing a context for the present invention, and should not be taken as an admission that any or all of the discussion were known at the time the invention was made.

To achieve the aforementioned object, the electrochemical device pertaining to an embodiment of the present invention has a positive electrode, a negative electrode, separators, and an electrolyte.

The positive electrode has: a positive-electrode collector made of conductive material; and positive-electrode active-material layers formed on the positive-electrode collector.

The negative electrode has: a first and second negative-electrode active-material layers and a negative-electrode collector which has; (i) a first principal face on which the first negative-electrode active-material layer is formed, and (ii) a second principal face having a coated area where the second negative-electrode active-material layer is formed, and an uncoated area where the second negative-electrode active-material layer is not formed, wherein the negative-electrode collector has multiple through holes that interconnect the first principal face and the second principal face, and the boundary of the coated area and the uncoated area intersects the opening of at least one of the multiple through holes.

The separators insulate the positive electrode and the negative electrode.

In the electrolyte, the positive electrode, negative electrode, and separators are immersed.

The aforementioned electrochemical device is such that a metallic lithium is electrically connected to the uncoated area and immersed in the electrolyte, to allow for pre-doping of the first and second negative-electrode active-material layers with lithium ions.

According to this configuration, the boundary of the coated area and the uncoated area intersects the openings of the through holes formed in the negative-electrode collector. This means that, when the second negative-electrode active-material layer expands due to doping of lithium ions, an end of the expanded second electrode active-material layer at the boundary enters into the through holes and moves away from the second principal face toward the first principal face. This mitigates excessive expansion of the negative electrode and suppresses deformation of the electric storage element. Accordingly, the electrochemical device pertaining to the present invention does not cause short-circuit failure, excessive rise in resistance, or other problems which would otherwise occur due to expansion of the negative electrode.

The bore of the through hole may be 50 μm or more, but no more than 150 μm.

This way, an end of the second negative-electrode active-material layer enters into the through hole more easily when the second negative-electrode active-material layer expands, which suppresses deformation of the electric storage element more effectively.

The negative-electrode collector may be made of copper.

Copper is strong and also highly flexible even in the form of a thin sheet, so it is an ideal material for negative-electrode collectors. By pressure-bonding this copper with the metallic lithium, intrusion of the electrolyte into the pressure-bonded interface, and consequent melting of the metallic lithium from the interface side, are suppressed. As a result, electrical continuity of the negative-electrode collector and the metallic lithium is maintained, and the metallic lithium melts properly.

The positive electrode and negative electrode may be wound together with the separators in between.

Under the present invention, the pre-doping time can be shortened even when the aforementioned electrochemical device is a wound electrochemical device whose positive electrode and negative electrode are stacked and wound together with separators in between. In particular, a wound electrochemical device has less excess space inside its case and thus can be made smaller than a multilayer electrochemical device.

As described above, an electrochemical device can be provided, according to the present invention, that does not present problems which would otherwise occur due to expansion of the negative electrode.

For purposes of summarizing aspects of the invention and the advantages achieved over the related art, certain objects and advantages of the invention are described in this disclosure. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description which follows.

BRIEF DESCRIPTION OF THE DRAWINGS

These and other features of this invention will now be described with reference to the drawings of preferred embodiments which are intended to illustrate and not to limit the invention. The drawings are greatly simplified for illustrative purposes and are not necessarily to scale.

FIG. 15 is a table summarizing the charge/discharge test results of the electrochemical devices pertaining to the Example and Comparative Examples 1 and 2 of the present invention.

DESCRIPTION OF THE SYMBOLS

100—Electrochemical device
110—Electric storage element
120—Container
130—Negative electrode
130a—First uncoated area
130b—Second uncoated area
130c—Third uncoated area
130d—Coated area
131—Negative-electrode terminal
132—Negative-electrode collector
132a—First principal face
132b—Second principal face
132c—Through hole
132d—Opening
132e—First area
132f—Second area
133—First negative-electrode active-material layer
134—Second negative-electrode active-material layer
140—Positive electrode
141—Positive-electrode terminal
142—Positive-electrode collector
142a—Third principal face
142b—Fourth principal face
143—Positive-electrode active-material layer
151—First separator
152—Second separator
B—Boundary
D—Bore of through hole
M—Metallic lithium

DETAILED DESCRIPTION OF EMBODIMENTS

The electrochemical device proposed by the present invention is explained. The electrochemical device pertaining to this embodiment is a lithium ion capacitor or other electrochemical device that utilizes lithium ions to transport electric charge. It should be noted that, in the figures presented below, the X, Y, and Z directions represent three directions that are orthogonal to one another.

[Constitution of Electrochemical Device]

Figure 1:
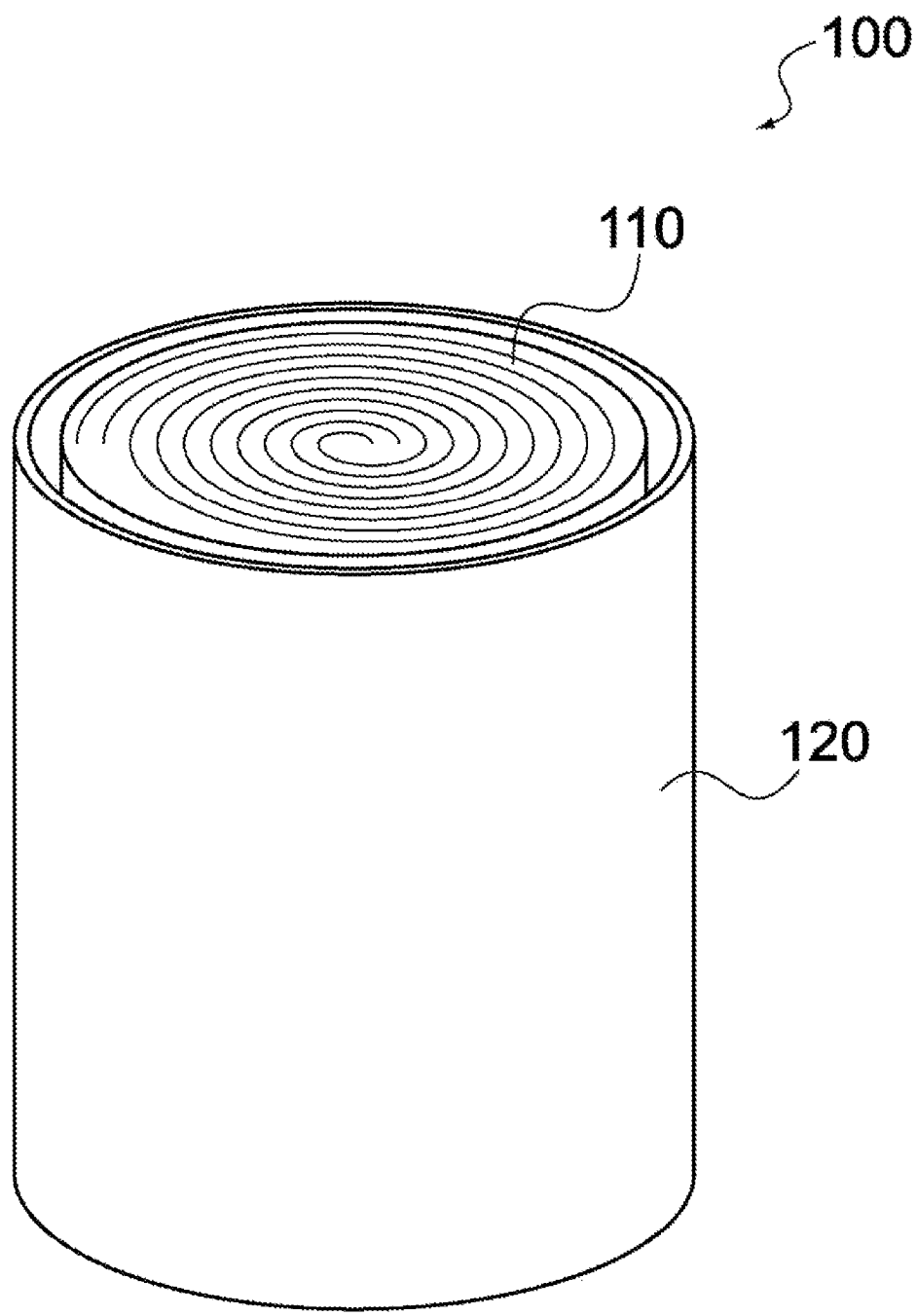
FIG. 1 is a perspective view showing the constitution of an electrochemical device according to an embodiment of the present invention.

FIG. 1 is a perspective view showing the constitution of an electrochemical device 100 pertaining to this embodiment. As shown in this figure, the electrochemical device 100 comprises an electric storage element 110 housed in a container 120 (lids and terminals are not illustrated). An electrolyte is housed in the container 120 together with the electric storage element 110. It should be noted that the constitution of the electrochemical device 100 pertaining to this embodiment is not limited to the constitution shown in FIG. 1 or other figures presented below.

Figure 2:
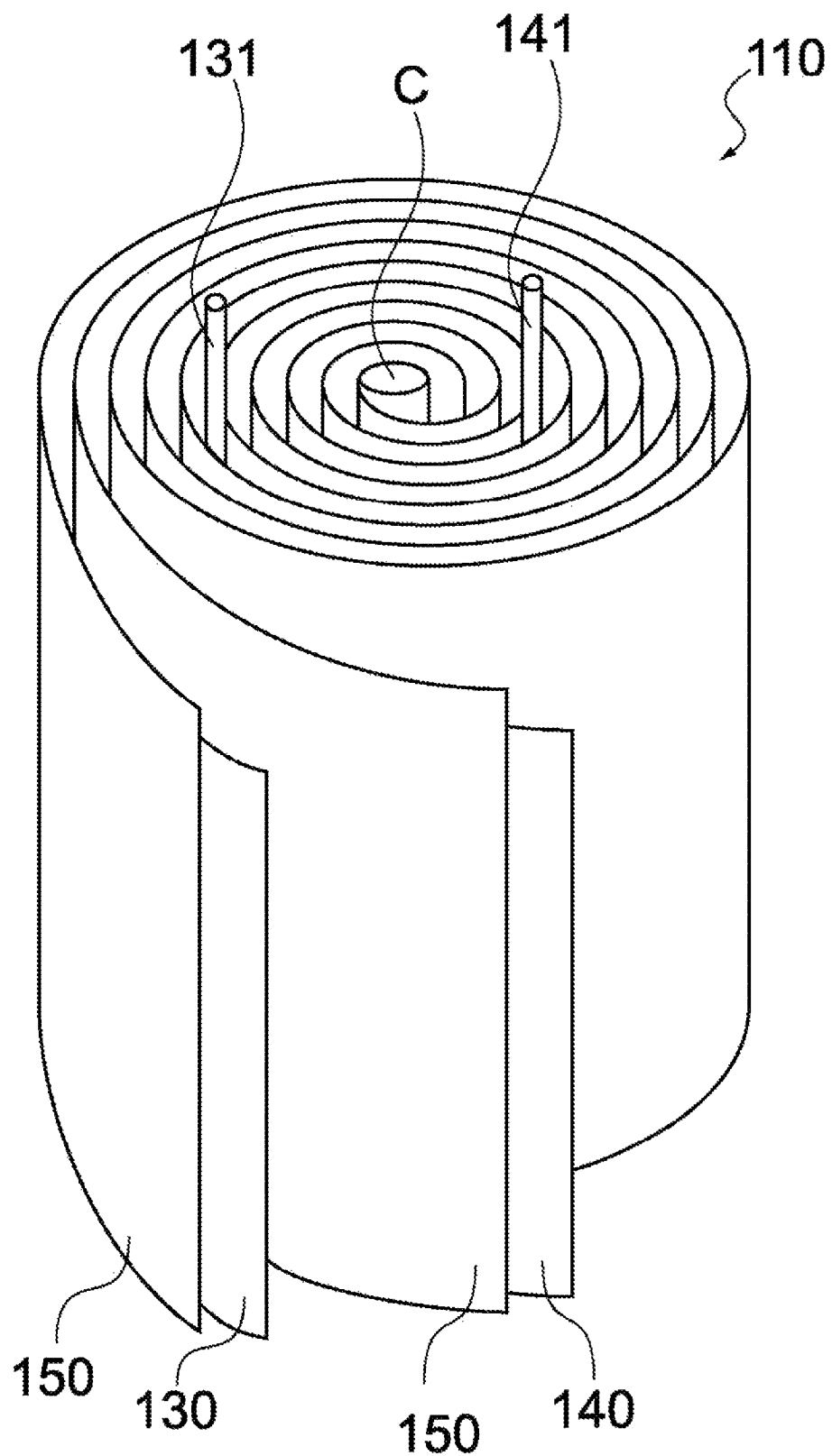
FIG. 2 is a perspective view of the electric storage element in an embodiment of the present invention.
Figure 3:
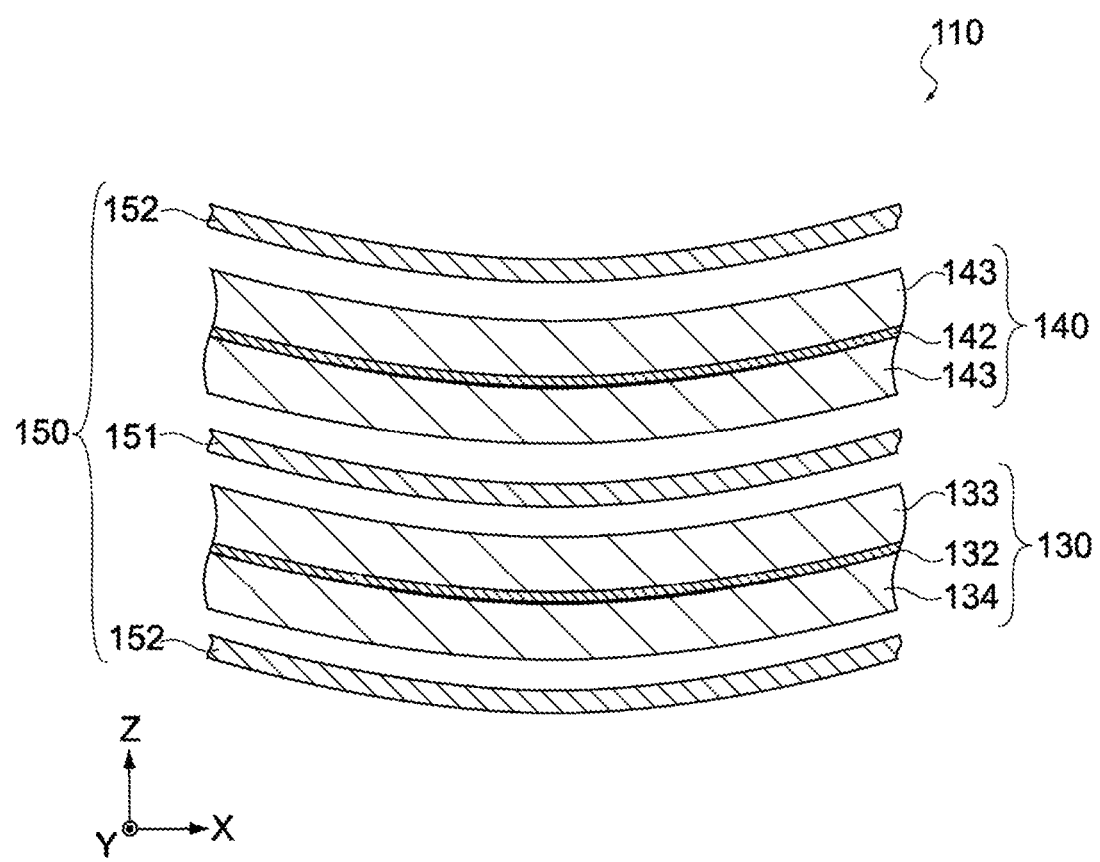
FIG. 3 is an enlarged cross-sectional view of the electric storage element in an embodiment of the present invention.

FIG. 2 is a perspective view of the electric storage element 110, while FIG. 3 is an enlarged cross-sectional view of the electric storage element 110. As shown in FIGS. 2 and 3, the electric storage element 110 is constituted by winding, around a winding core C, a laminate having a negative electrode 130, a positive electrode 140, and separators 150, all stacked together. It should be noted that the winding core C need not be provided.

The stacking sequence of the negative electrode 130, positive electrode 140, and separators 150 constituting the electric storage element 110 is "separator 150, negative electrode 130, separator 150, and positive electrode 140" toward the winding core C (from the outer side of winding), as shown in FIG. 2. Also, the electric storage element 110 has a negative-electrode terminal 131 and a positive-electrode terminal 141, as shown in FIG. 2. The negative-electrode terminal 131 is connected to the negative electrode, while the positive-electrode terminal 141 is connected to the positive electrode, and both are led out to the exterior of the electric storage element 110, as shown in FIG. 2.

As shown in FIG. 3, the negative electrode 130 has a negative-electrode collector 132, a first negative-electrode active-material layer 133, and a second negative-electrode active-material layer 134. The negative-electrode collector 132 is made of conductive material and may be a copper foil or other metal foil. In this embodiment, a metal foil having multiple through holes formed in it, is adopted for the negative-electrode collector 132.

The first and second negative-electrode active-material layers 133, 134 are formed on the negative-electrode collector 132. The material of the first and second negative-electrode active-material layers 133, 134 may be a mixture of a negative-electrode active material with a binder resin, and it may further contain a conductive auxiliary agent. The negative-electrode active material is a material capable of adsorbing the lithium ions in the electrolyte, for which non-graphitizable carbon (hard carbon), graphite, soft carbon, or other carbon material, Si, SiO, or other alloy material, or any composite material made from the foregoing, may be used, for example.

The binder resin is a synthetic resin that joins the negative-electrode active material, for which styrene butadiene rubber, polyethylene, polypropylene, aromatic polyamide, carboxy methyl cellulose, fluororubber, polyvinylidene fluoride, isoprene rubber, butadiene rubber, ethylene propylene rubber, etc., may be used, for example.

The conductive auxiliary agent comprises grains made of conductive material and improves the conductivity between the negative-electrode active materials. The conductive auxiliary agent may be graphite, carbon black, or other carbon material, for example. Any of these materials may be used alone, or multiple types of materials may be mixed together. It should be noted that the conductive auxiliary agent may also be a metal, conductive polymer, or other material so long as it has conductivity.

Figure 4A:
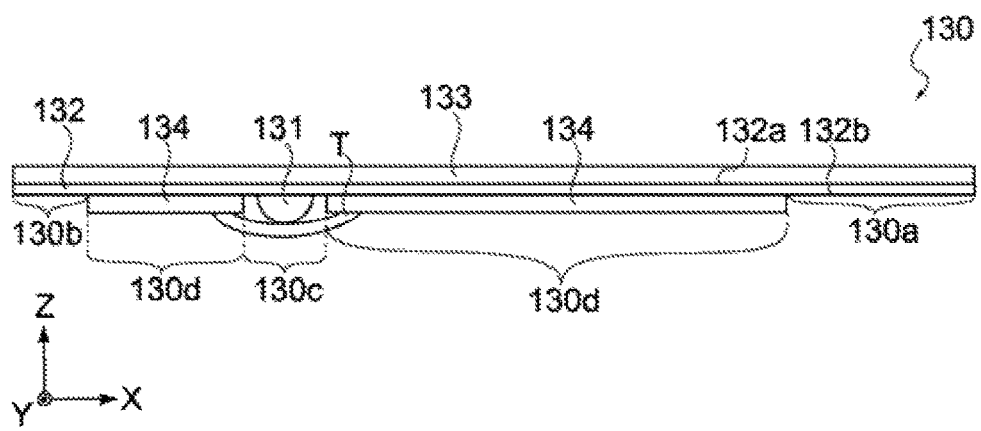
FIGS. 4A and 4B are schematic views showing the negative electrode before winding in an embodiment of the present invention.
Figure 4B:
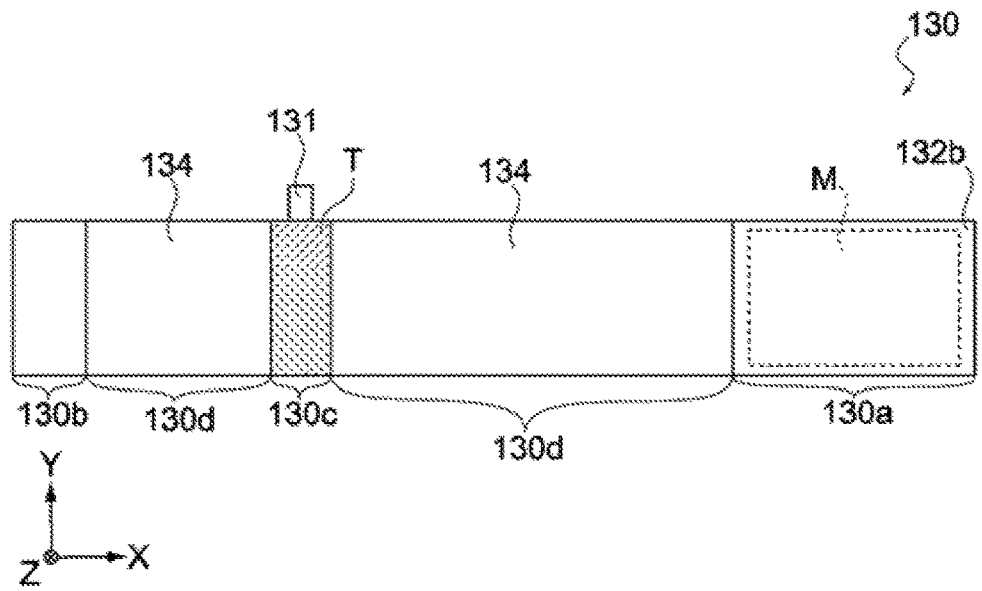

FIGS. 4A and 4B present schematic views showing the negative electrode 130 before winding, where FIG. 4A is a side view and FIG. 4B is a plan view. The negative electrode 130 pertaining to this embodiment has its first negative-electrode active-material layer 133 formed on the first principal face 132a, and its second negative-electrode active-material layer 134 formed on the second principal face 132b, of the negative-electrode collector 132, as shown in FIG. 4A. Also, multiple through holes 132c interconnecting the first and second principal faces 132a, 132b are provided in the negative-electrode collector 132 (refer to FIG. 5).

In addition, the negative electrode 130 has, on the second principal face 132b, a first uncoated area 130a, a second uncoated area 130b, and a third uncoated area 130c, where the second negative-electrode active-material layer 134 is not formed, as shown in FIG. 4A. Furthermore, coated areas 130d where the second negative-electrode active-material layer is formed are provided on the second principal face 132b. The second negative-electrode active-material layer 134 is formed intermittently on the second principal face 132b.

A metallic lithium M to serve as a supply source of lithium ions is attached and thus electrically connected to the negative-electrode collector 132 inside the first uncoated area 130a, as shown in FIG. 4B. The shape of the metallic lithium M is not limited in any way, but a foil is preferred in order to reduce the thickness of the electric storage element 110. The metallic lithium M may be provided by a quantity sufficient to allow for doping of the first and second negative-electrode active-material layers 133, 134 during the course of lithium ion pre-doping as described later.

The X-direction length of the first uncoated area 130a and that of the second uncoated area 130b are not limited in any way, but preferably the X-direction length of the second uncoated area 130b is approx. ½ π times the diameter of the winding core C. A constitution where the second uncoated area 130b is not provided is also acceptable.

The negative-electrode terminal 131 is connected to the negative-electrode collector 132 inside the third uncoated area 130c, and led out to the exterior of the negative electrode 130, as shown in FIG. 4A. Also, the third uncoated area 130c pertaining to this embodiment is sealed by a tape T so that the negative-electrode collector 132 inside the third uncoated area 130c will not be exposed, as shown in FIG. 4A. The type of the tape T is not limited in any way, but preferably a type having heat resistance as well as resistance to the solvent of the electrolyte is adopted. The negative-electrode terminal 131 is a copper terminal, for example. It should be noted that the tape T may be omitted, if necessary.

Figure 5:
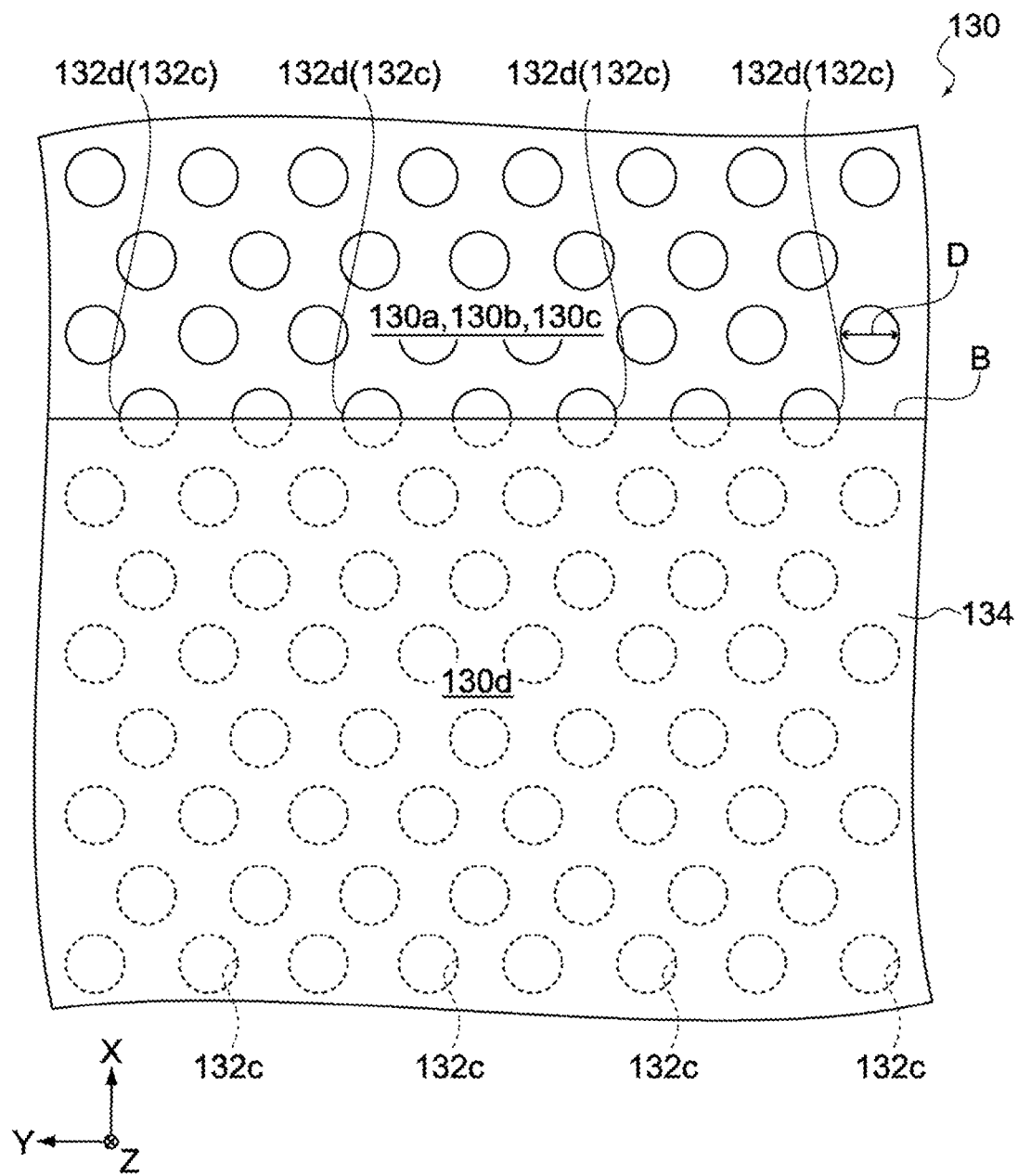
FIG. 5 is an enlarged view of the area around an end of the second negative-electrode active-material layer in an embodiment of the present invention.

FIG. 5 is an enlarged view of the areas around the X-direction end of the second negative-electrode active-material layer 134 formed on the second principal face 132b of the negative-electrode collector 132.

The negative electrode 130 pertaining to this embodiment is such that, as shown in FIG. 5, the boundary B of the first, second, or third uncoated area 130a, 130b, or 130c and the coated area 130d in which the second negative-electrode active-material layer 132 is formed, intersects the openings 132d of the multiple through holes 132c formed in the negative-electrode collector 132.

The bore D of the through hole 132c is not limited in any way, but to suppress the below-mentioned problems the electrochemical device 100 would otherwise encounter due to expansion of the second negative-electrode active-material layer 134, preferably it is 50 μm or more, but no more than 150 μm, for example. Also, while the shape of the opening 132d of the through hole 132c is typically circular, the shape is not limited in any way and it may be triangular, oval, rectangular, etc.

It should be noted that, while the boundary B intersects the openings 132d of all of the multiple through holes 132c aligned along the boundary B in the Y direction in FIG. 5, it suffices in an embodiment that the openings 132d are aligned in a manner that the boundary B intersects the opening 132d of at least one of the multiple through holes 132c. In addition, the number and size of the through holes 132c shown in FIG. 5 are for illustration purposes only, as the actual holes are smaller and higher in number.

The positive electrode 140 has a positive-electrode collector 142 and positive-electrode active-material layers 143, as shown in FIG. 3. The positive-electrode collector 142 is made of conductive material and may be an aluminum foil or other metal foil. The positive-electrode collector 142 may be a metal foil whose surface has been chemically or mechanically roughened, or a metal foil in which through holes have been formed.

The positive-electrode active-material layers 143 are formed on the positive-electrode collector 142. The material of the positive-electrode active-material layers 143 may be a mixture of a positive-electrode active material with a binder resin, and it may further contain a conductive auxiliary agent. The positive-electrode active material is a material capable of adsorbing the lithium ions and anions in the electrolyte, for which active carbon, polyacene carbide, etc., may be used, for example.

The binder resin is a synthetic resin that joins the positive-electrode active material, for which styrene butadiene rubber, polyethylene, polypropylene, aromatic polyamide, carboxy methyl cellulose, fluororubber, polyvinylidene fluoride, isoprene rubber, butadiene rubber, ethylene propylene rubber, etc., may be used, for example.

The conductive auxiliary agent comprises grains made of conductive material and improves the conductivity between the positive-electrode active materials. The conductive auxiliary agent may be graphite, carbon black, or other carbon material, for example. Any of these materials may be used alone, or multiple types of materials may be mixed together. It should be noted that the conductive auxiliary agent may also be a metal, conductive polymer, or other material so long as it has conductivity.

Figure 6A:
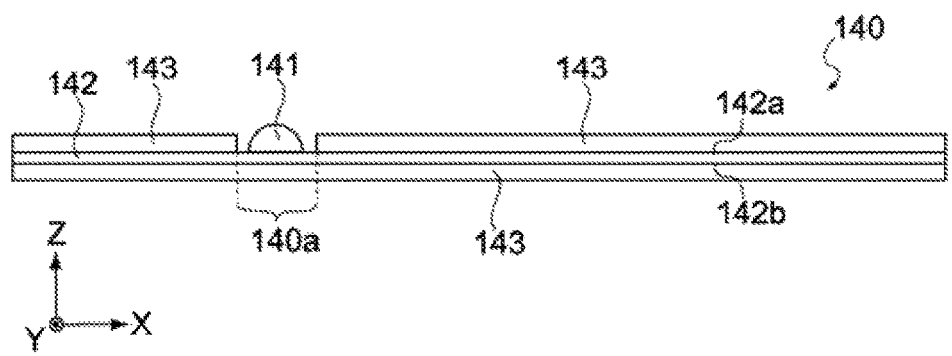
FIGS. 6A and 6B are schematic views showing the positive electrode before winding in an embodiment of the present invention.
Figure 6B:
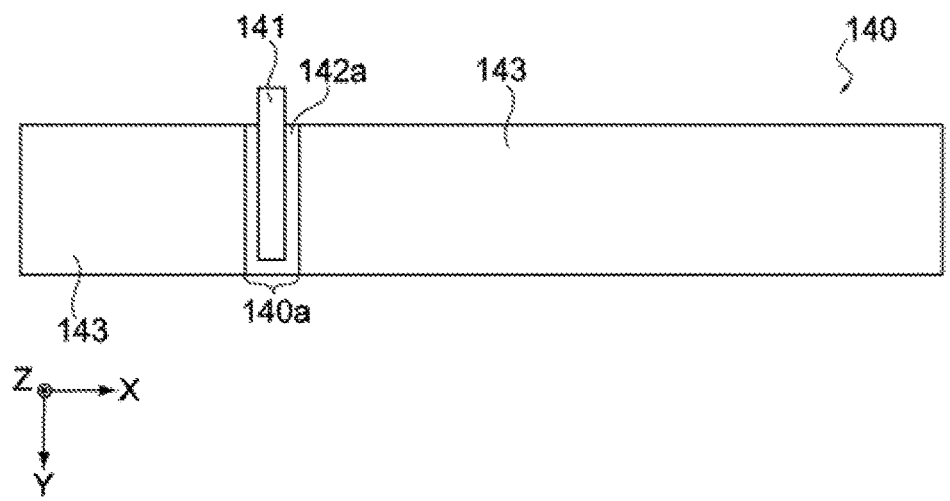

FIGS. 6A and 6B present schematic views showing the positive electrode 140 before winding, where FIG. 6A is a side view and FIG. 6B is a plan view. The positive electrode 140 pertaining to this embodiment has its positive-electrode active-material layers 143 formed on both the third principal face 142a and fourth principal face 142b of the positive-electrode collector 142, and a separation area 140a where the positive-electrode active-material layer 143 is not formed is provided on the third principal face 142a.

Now, as shown in FIGS. 6A and 6B, the positive-electrode terminal 141 is connected to the positive-electrode collector 142 inside the separation area 140a, and led out to the exterior of the positive electrode 140. It should be noted that the positive electrode 140 may have this separation area 140a, where the positive-electrode terminal 141 is located, formed on the fourth principal face 142b. The separation area 140a may also be sealed with a tape, etc. The positive-electrode terminal 141 is an aluminum terminal, for example.

The separators 150 insulate the negative electrode 130 and the positive electrode 140, and include a first separator 151 and a second separator 152, as shown in FIG. 3.

The first separator 151 and second separator 152 separate the negative electrode 130 and the positive electrode 140, while letting the below-mentioned ions contained in the electrolyte permeate through them. To be specific, the first separator 151 and second separator 152 may each be a woven fabric, nonwoven fabric, synthetic resin microporous membrane, etc., whose primary material is olefin resin, for example. Also, the first separator 151 and second separator 152 may be one continuous separator.

Figure 7:
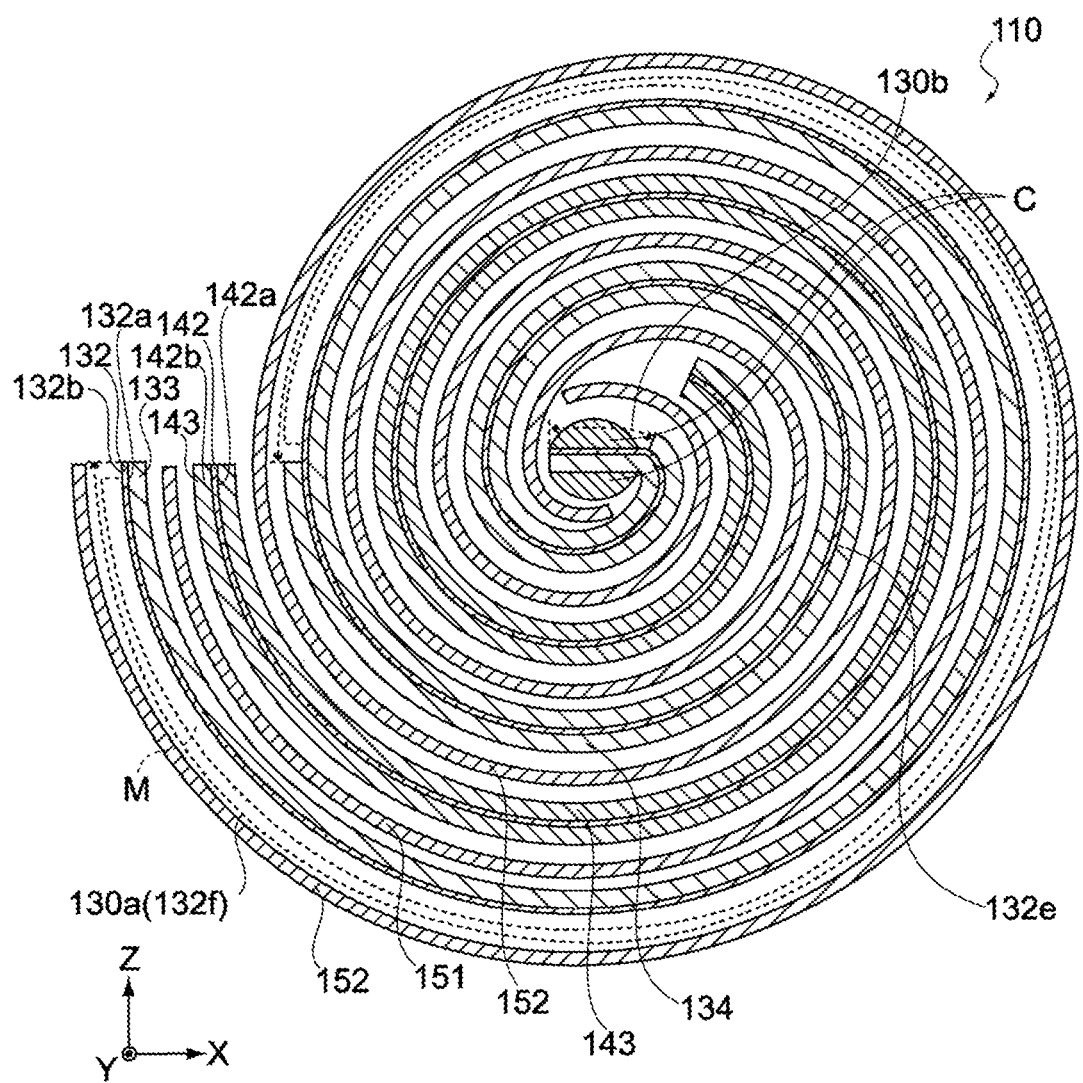
FIG. 7 is a cross-sectional view of the electric storage element in an embodiment of the present invention.

FIG. 7 is a cross-sectional view of the electric storage element 110 (negative-electrode terminal 131 and positive-electrode terminal 141 are not illustrated). The electric storage element 110 pertaining to this embodiment has its negative electrode 130 and positive electrode 140 stacked and wound together with the first separator 151 and second separator 152 in between, as shown in FIG. 7. To be specific, it is constituted in such a way that the first principal face 132a of the negative-electrode collector 132 and the third principal face 142a of the positive-electrode collector 142 come to the inner side of winding, while the second principal face 132b of the negative-electrode collector 132 and the fourth principal face 142b of the positive-electrode collector 142 come to the outer side of winding.

Now, the electric storage element 110 is constituted in such a way that the electrode on the outermost side of winding (outermost periphery) becomes the negative electrode 130, and as shown in FIG. 7, the first uncoated area 130a is provided on the second principal face 132b of the negative-electrode collector 132 on the outermost side of winding, while the second uncoated area 130b is provided at the end of the negative-electrode collector 132 on the innermost side of winding.

Also, the first principal face 132a of the negative-electrode collector 132 faces the positive electrode 140 (positive-electrode active-material layer 143) via the first separator 151, as shown in FIG. 7. The second principal face 132b has a first area 132e that faces the positive electrode 140 (positive-electrode active-material layer 143) via the second separator 152, and a second area 132f that constitutes the outermost side of winding and does not face the positive electrode 140 (positive-electrode active-material layer 143) via the second separator 152, as shown in the same figure. The electric storage element 110 in this embodiment is such that a metallic lithium M is attached and thus electrically connected to this second area 132f.

The container 120 houses the electric storage element 110. The top face and bottom face of the container 120 may be closed with lids that are not illustrated. The material of the container 120 is not limited in any way, and it may be made of a metal whose primary component is aluminum, titanium, nickel, or iron, or of stainless steel, etc., for example.

The electrochemical device 100 is constituted as described above. The electrolyte housed in the container 120 together with the electric storage element 110 is not limited in any way, but a solution whose solute is $LiPF_6$, etc., may be used.

[Operations of Electrochemical Device]

A general lithium ion capacitor is charged/discharged as the anions in the electrolyte are adsorbed into the positive electrode while the lithium ions in the electrolyte are doped (occluded or adsorbed) into the negative electrode when charging, and as the anions adsorbed into the positive electrode are desorbed while the lithium ions doped into the negative electrode are de-doped (separated or released) when discharging.

Now, a conventional lithium ion capacitor is subject to its electric storage element deforming as a result of expansion of the negative-electrode active-material layer as the lithium ions are doped into the negative-electrode active-material layer. When this happens, short-circuit failure, excessive rise in resistance, or other problems may occur. Such expansion is particularly prominent near an end of the negative-electrode active-material layer that contacts the electrolyte over a large area.

On the other hand, the electrochemical device 100 pertaining to this embodiment is such that the boundary B of the coated area 130d and the uncoated area 130a, 130b, or 130c intersects the openings 132d of multiple through holes 132c, as shown in FIG. 5.

This means that, as the second negative-electrode active-material layer 134 expands due to lithium-ion doping, an end of the expanded second negative-electrode active-material layer 134 enters into the through holes 132c and moves away from the second principal face 132b toward the first principal face 132a. This mitigates excessive expansion of the negative electrode 130 and suppresses deformation of the electric storage element 110. Accordingly, the electrochemical device 100 pertaining to this embodiment is constituted to suppress the aforementioned problems which would otherwise occur due to expansion of the negative electrode 130.

Particularly in this embodiment, setting the bore D of the through hole 132c in the negative-electrode collector 132 to 50 μm or more, but no more than 150 μm, suppresses deformation of the electric storage element 110 more effectively, because doing so allows an end of the second negative-electrode active-material layer 134 to enter into the through holes 132c more easily when the second negative-electrode active-material layer 134 expands.

[Method for Manufacturing Electrochemical Device]

The method for manufacturing the electrochemical device 100 pertaining to this embodiment is explained. It should be noted that the manufacturing method described below is only an example, and the electrochemical device 100 can be manufactured using a manufacturing method different from the manufacturing method described below. FIGS. 8A through 12C are schematic views showing a process for manufacturing the electrochemical device 100.

Figure 8A:
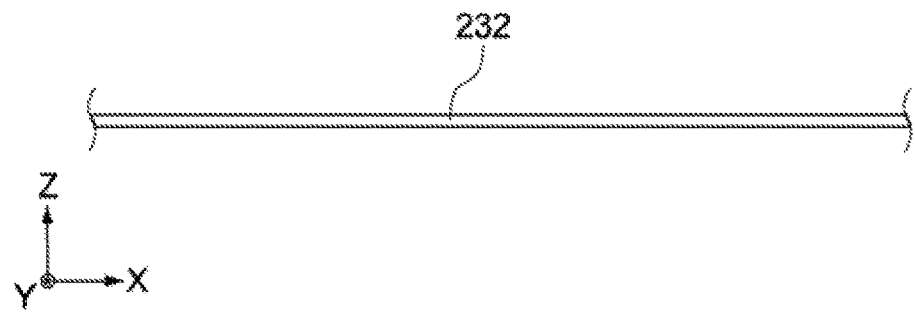
FIGS. 8A through 8C are schematic views showing the process for manufacturing the electrochemical device pertaining to an embodiment of the present invention.

FIG. 8A shows a metal foil 232 in which through holes have been formed, to be used as the basis of the negative-electrode collector 132. The metal foil 232 is a copper foil, for example. The thickness of the metal foil 232, although not limited in any way, may be in a range of several tens of micrometers to several hundred micrometers, for example.

Figure 8B:
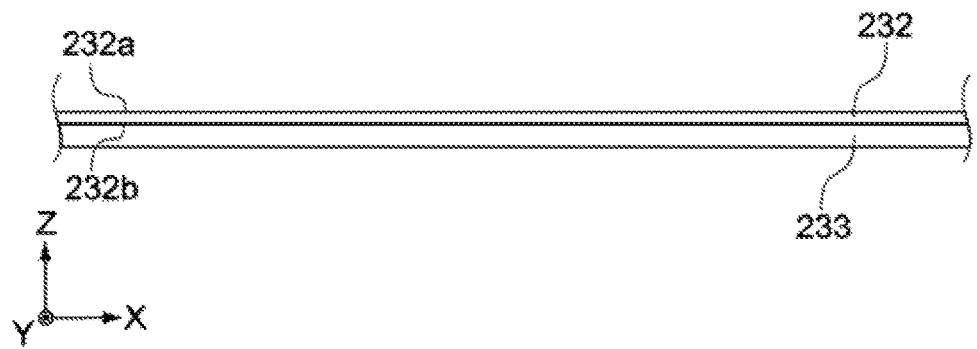

Next, a negative electrode paste containing negative-electrode active material, conductive auxiliary agent, binder, etc., is applied on a back face 232b of the metal foil 232, and then dried or cured. As a result, a first negative-electrode active-material layer 233 is formed on the back face 232b of the metal foil 232, as shown in FIG. 8B.

Figure 8C:
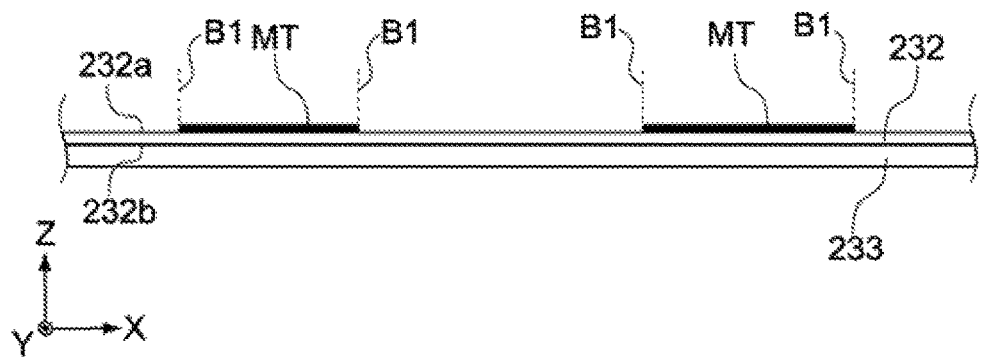

Subsequently, as shown in FIG. 8C, masking tapes MT are attached, at equal intervals along the X direction, on a front face 232a of the metal foil 232. To be specific, masking tapes MT are attached on the front face 232a in such a way that the boundary B1 of the masking tape MT and the front face 232a intersects the openings of the through holes formed in the metal foil 232. It should be noted that the through holes formed in the metal foil 232 are not illustrated in FIGS. 8A through 12C.

Figure 9A:
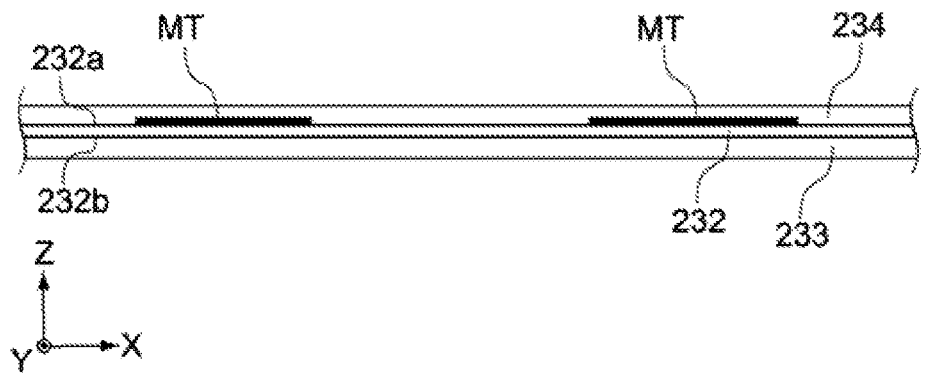
FIGS. 9A through 9C are schematic views showing the process for manufacturing the electrochemical device pertaining to an embodiment of the present invention.

Next, the negative electrode paste is applied again on the front face 232a of the metal foil 232 on which the masking tapes MT have been attached, and then dried or cured, to form a second negative-electrode active-material layer 234 on the front face 232a, as shown in FIG. 9A.

Figure 9B:
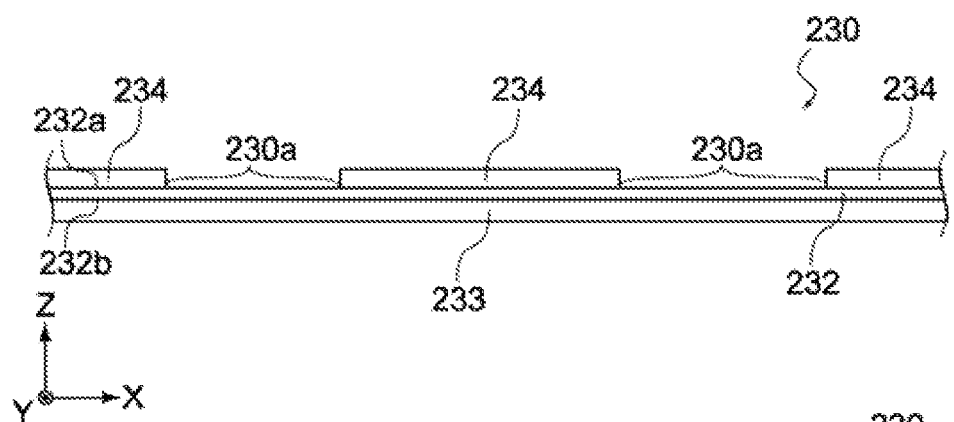

Next, the second negative-electrode active-material layer 234 formed on the front face 232a of the metal foil 232 is partially removed by separating the masking tapes MT, to obtain an electrode layer 230 on which separation areas 230a have been formed where the metal foil 232 is exposed, as shown in FIG. 9B. It should be noted that the method for forming the second negative-electrode active-material layer 234 is not limited in any way, and the layer may be formed using a method other than masking.

Figure 9C:
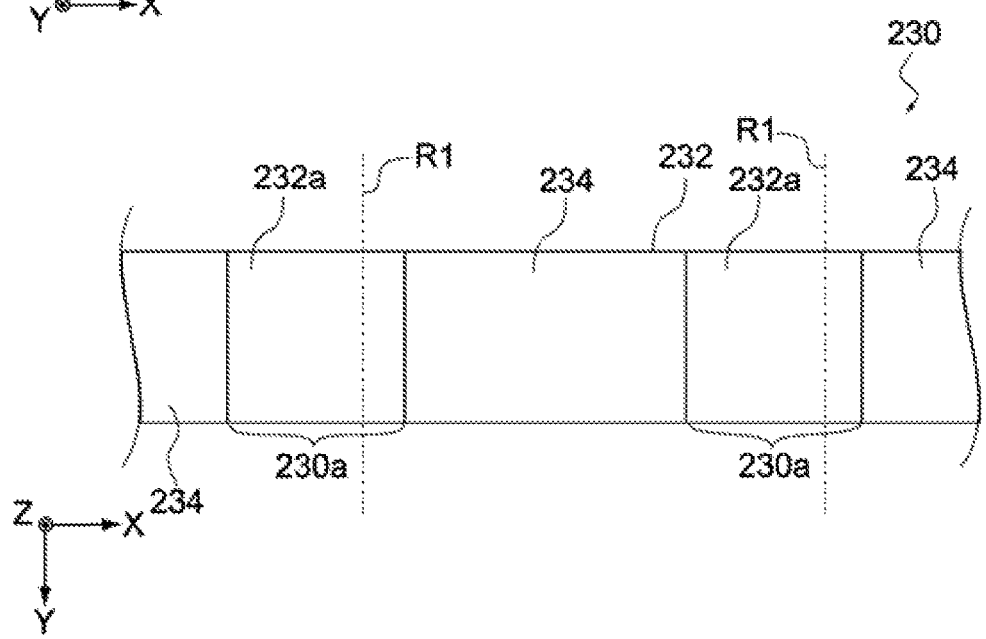
Figure 10A:
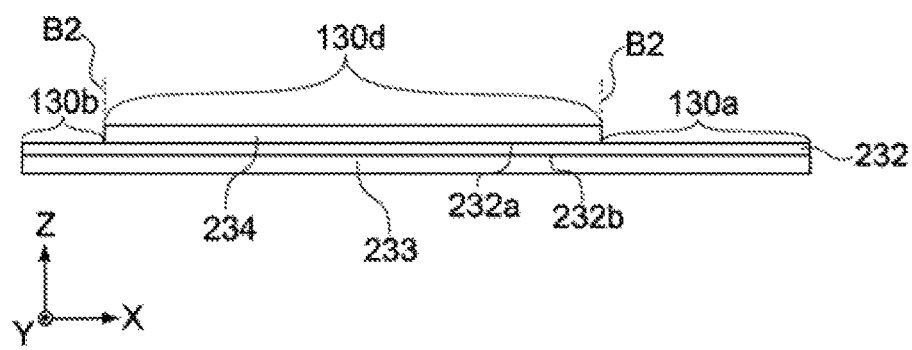
FIGS. 10A and 10B are schematic views showing the process for manufacturing the electrochemical device pertaining to an embodiment of the present invention.

Next, as shown in FIG. 9C, both the metal foil 232 and the first negative-electrode active-material layer 233 are cut (along the dotted lines R1 shown in FIG. 9C) between the second negative-electrode active-material layers 234 that have been formed at specific intervals on the front face 232a of the metal foil 232. This way, first and second uncoated areas 130a, 130b where the second negative-electrode active-material layer 234 is not formed, and a coated area 130d where the second negative-electrode active-material layer 234 is formed, are formed on the front face 232a of the metal foil 232, as shown in FIG. 10A.

In this embodiment, the masking tapes MT are attached on the front face 232a as described above, and therefore the boundary B2 of the first or second uncoated area 130a or 130b and the coated area 130d intersects the openings of the through holes formed in the metal foil 232.

Figure 10B:
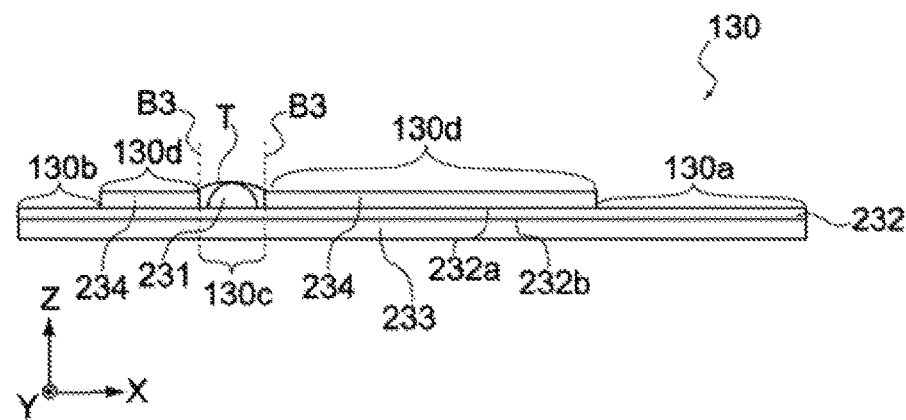

Next, the second negative-electrode active-material layer 234 formed on the front face 232a of the metal foil 232 is partially separated to form a third uncoated area 130c where the metal foil 232 is exposed, as shown in FIG. 10B. This way, the second negative-electrode active-material layer 234 is formed intermittently on the front face 232a of the metal foil 232, as shown in the same figure. The boundary B3 of the third uncoated area 130c and the coated area 130d intersects the openings of the through holes formed in the metal foil 232 in the same way the boundaries B1, B2 do.

Next, as shown in the same figure, the negative-electrode terminal 231 is connected to the metal foil 232 inside the third uncoated area 130c, after which the third uncoated area 130c is sealed with a tape T, to obtain a negative electrode 130.

Figure 11A:
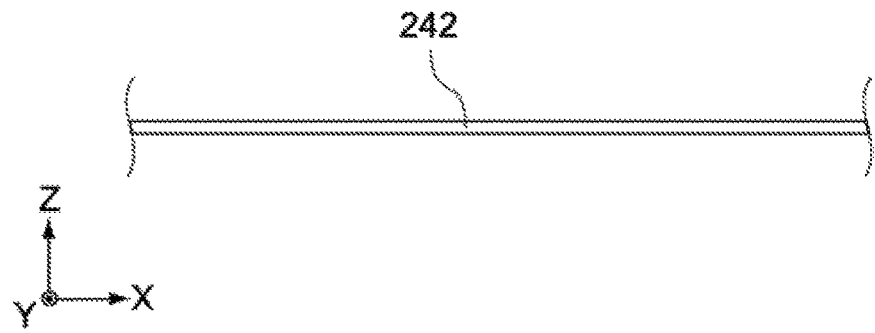
FIGS. 11A through 11C are schematic views showing the process for manufacturing the electrochemical device pertaining to an embodiment of the present invention.

Next, as shown in FIG. 11A, a metal foil 242 to be used as the basis of the positive-electrode collector 142 is prepared. The metal foil 242 is an aluminum foil, for example. The thickness of the metal foil 242, although not limited in any way, may be in a range of several tens of micrometers to several hundred micrometers, for example.

Figure 11B:
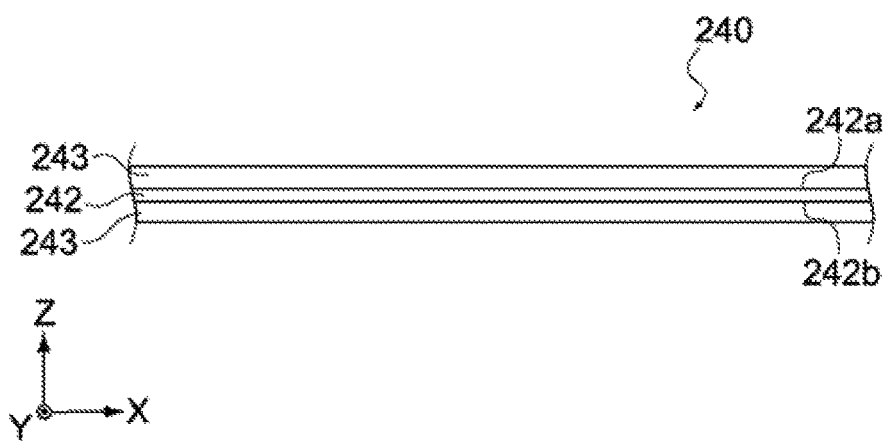

Next, a positive electrode paste containing positive-electrode active material, conductive auxiliary agent, binder, etc., is applied on a front face 242a and back face 242b of the metal foil 242, and then dried or cured. As a result, an electrode layer 240 constituted by the metal foil 242 and positive-electrode active-material layers 243 formed thereon, is obtained, as shown in FIG. 11B.

Figure 11C:
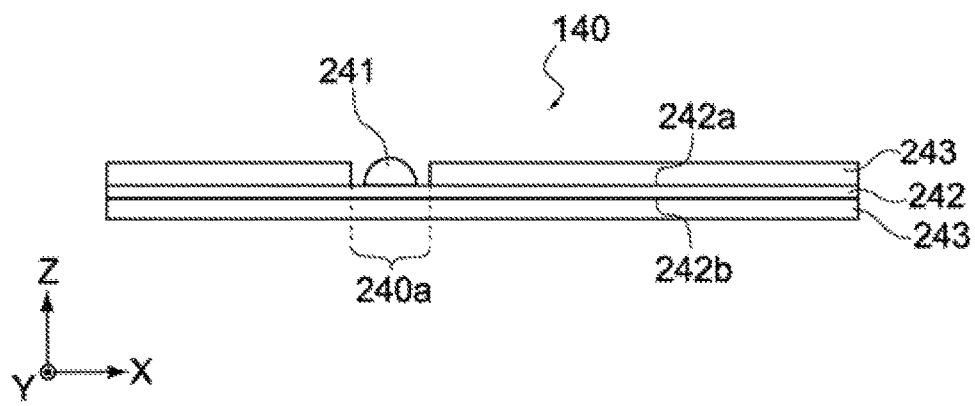

Next, the electrode layer 240 is cut, after which the positive-electrode active-material layer 243 formed on either the front face 242a or back face 242b of the metal foil 242 is partially separated, to form a separation area 240a where the metal foil 242 is exposed, as shown in FIG. 11C. Then, as shown in the same figure, a positive-electrode terminal 241 is connected to the metal foil 242 inside the separation area 240a, to obtain a positive electrode 140.

Figure 12A:
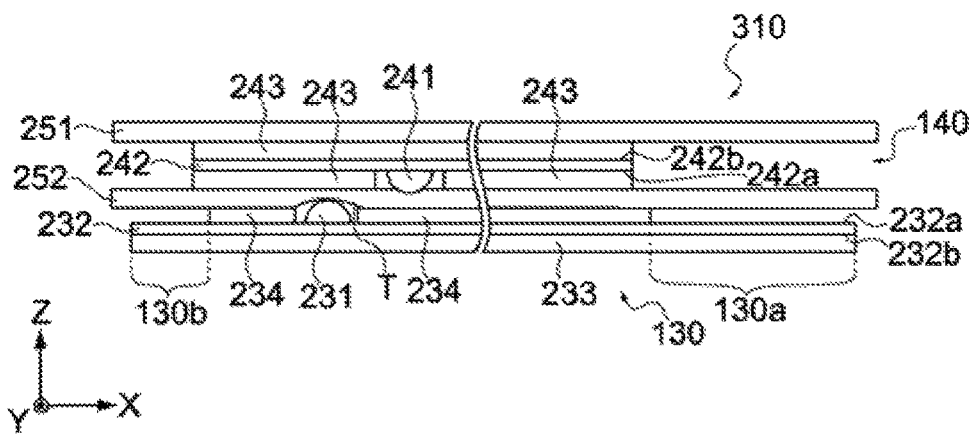
FIGS. 12A through 12C are schematic views showing the process for manufacturing the electrochemical device pertaining to an embodiment of the present invention.
Figure 12B:
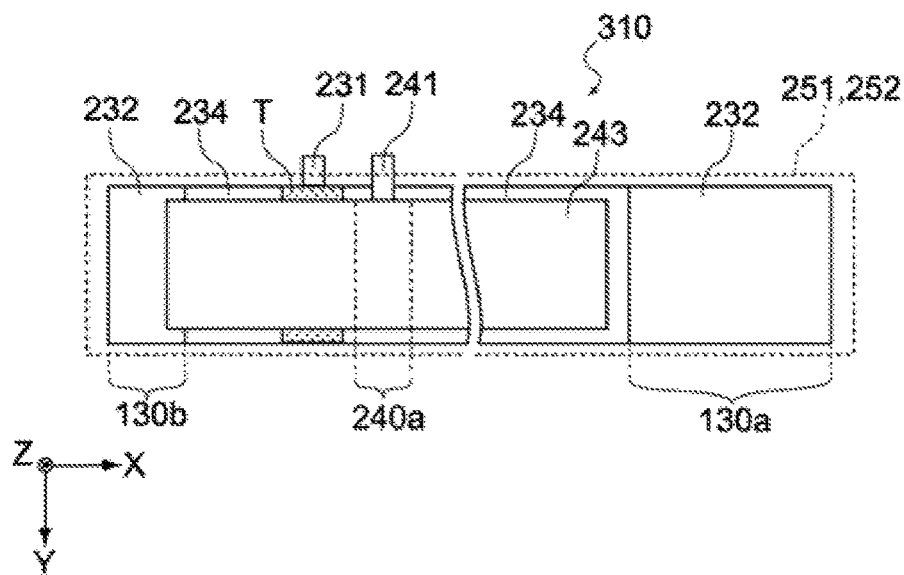

Next, the negative electrode 130, positive electrode 140, first separator 251, and second separator 252 are stacked together to obtain a laminate 310, as shown in FIGS. 12A and 12B. Here, the laminate 310 is positioned so that the negative electrode 130 comes to the inner side of winding, the positive electrode 140 comes to the outer side of winding, and the second uncoated area 130b of the negative electrode 130 comes to the winding core C side, as shown in FIG. 12A. It should be noted that FIG. 12B is a plan view of the laminate 310 shown in FIG. 12A.

Figure 12C:
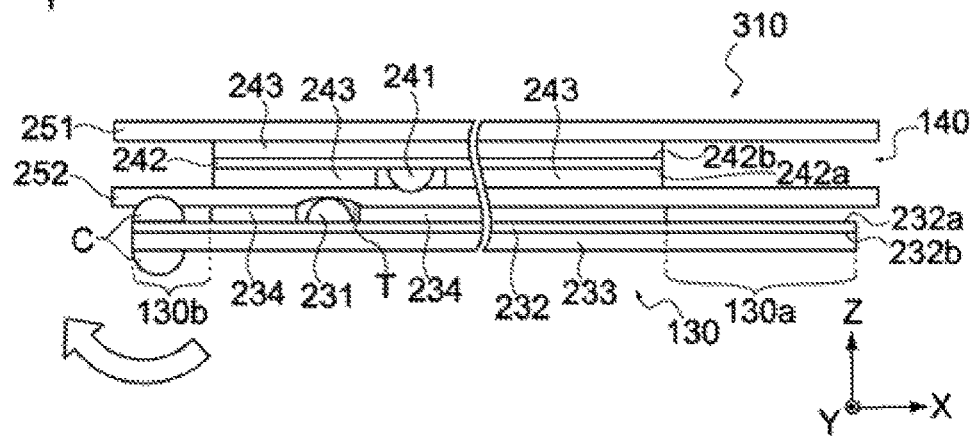

Next, as shown in FIG. 12C, the positive electrode 140 is shifted in the X direction by a specified amount so that the positive electrode 140 will not face the second uncoated area 130b via the second separator 252. And, as shown in the same figure, the metal foil 232 and first negative-electrode active-material layer 233 inside the second uncoated area 130b are sandwiched in the winding core C, and then the laminate 310 is wound around the winding core C in a manner going around the Y axis, so that the first uncoated area 130a becomes the outermost side of winding.

This way, a wound body where the back face 232b of the metal foil 232 and the front face 242a of the metal foil 242 come to the inner side of winding, while the front face 232a of the metal foil 232 and the back face 242b of the metal foil 242 come to the outer side of winding, is obtained (refer to FIGS. 2 and 7).

Subsequently, a metallic lithium M is electrically connected to the first uncoated area 130a positioned on the outermost side of winding of the wound body obtained by the aforementioned step (refer to FIG. 7), to obtain an electric storage element 110. Next, the electric storage element 110 to which the metallic lithium M has been electrically connected, is housed in a container 120 filled with an electrolyte, and the container 120 is sealed. This way, lithium ions will be pre-doped into the negative electrode 130 from the metallic lithium M. It should be noted that the electrochemical device 100 pertaining to this embodiment suppresses a deformation of the electric storage element 100 which would otherwise occur due to expansion of the negative electrode 130, not only during charging and discharging, but also during pre-doping.

The electrochemical device 100 can be manufactured as described above. It should be noted that the negative-electrode terminal 231 corresponds to the negative-electrode terminal 131, while the positive-electrode terminal 241 corresponds to the positive-electrode terminal 141. The separation area 240a corresponds to the separation area 140a. Also, the boundaries B2 and B3 correspond to the boundary B.

Furthermore, the metal foil 232 corresponds to the negative-electrode collector 132, the metal foil 242 corresponds to the positive-electrode collector 142, the first negative-electrode active-material layer 233 corresponds to the first negative-electrode active-material layer 133, and the second negative-electrode active-material layer 234 corresponds to the second negative-electrode active-material layer 134. Also, the positive-electrode active-material layer 243 corresponds to the positive-electrode active-material layer 143.

In addition, the front faces 232a and 242a correspond to the second principal face 132b and third principal face 142a, respectively, and the back faces 232b and 242b correspond to the first principal face 132a and fourth principal face 142b, respectively. Also, the first separator 251 corresponds to the first separator 151, and the second separator 252 corresponds to the second separator 152.

EXAMPLE

An Example of the present invention is explained below.
[Creation of Lithium Ion Capacitors]
Cylindrical lithium ion capacitor samples pertaining to the Example and Comparative Examples 1 and 2 were produced according to the aforementioned manufacturing method. The samples pertaining to the Example and Comparative Examples 1 and 2 all had a capacitance of 300 F.

EXAMPLE

The sample pertaining to the Example is such that the boundary of an uncoated area and a coated area intersects the openings of the multiple through holes formed in the negative-electrode collector (refer to FIG. 5).

Comparative Example 1

Figure 13:
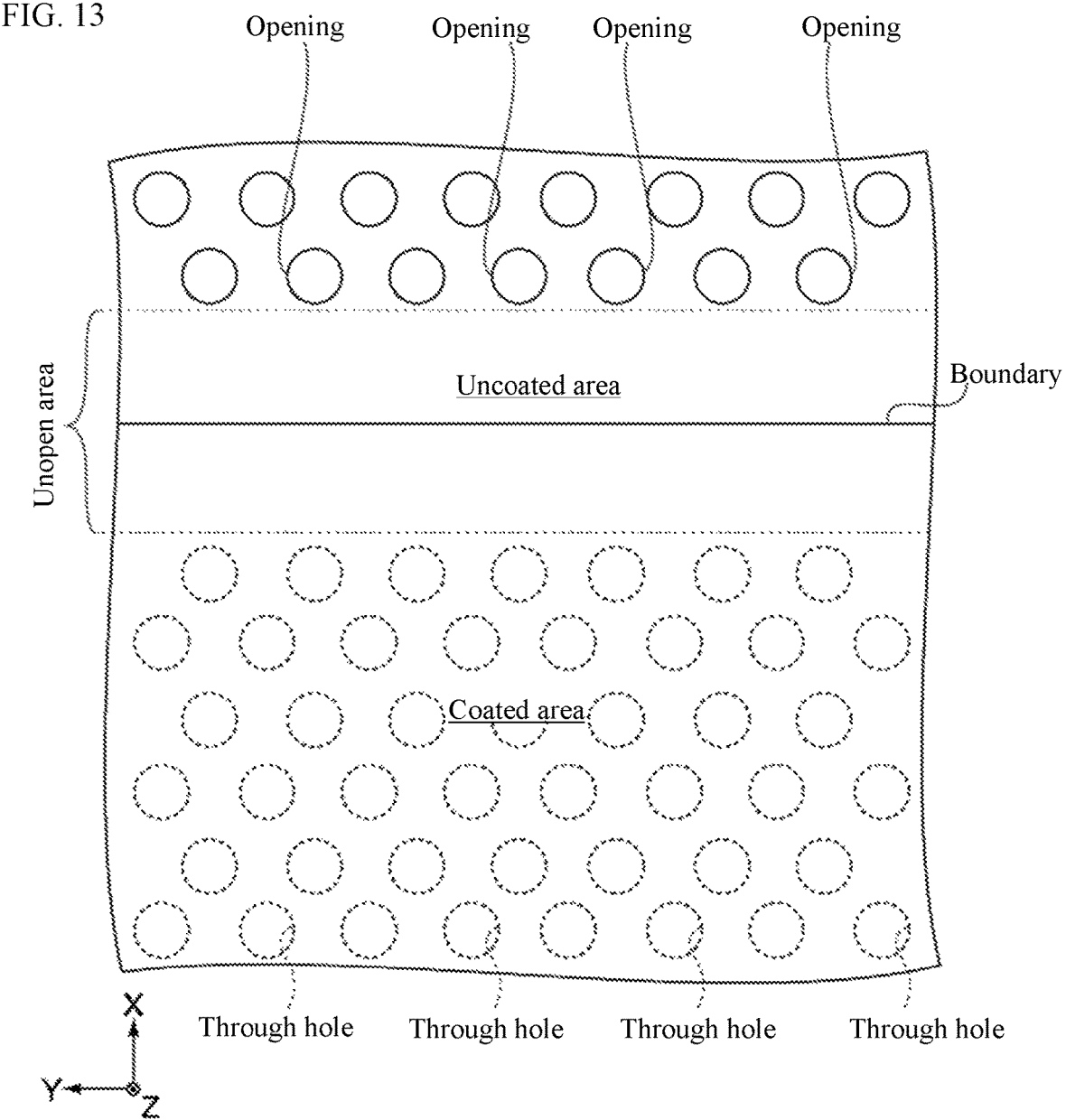
FIG. 13 is an enlarged view of the area around an end of the second negative-electrode active-material layer in the electrochemical device pertaining to Comparative Example 1 of the present invention.

FIG. 13 is an enlarged view of the area around an end of the second negative-electrode active-material layer in the sample pertaining to Comparative Example 1. The sample pertaining to Comparative Example 1 shares the same constitution with the sample pertaining to the Example, except that a copper foil having unopen areas where through holes are not formed is adopted as the negative-electrode collector, and that the boundary of an uncoated area and a coated area is positioned in the unopen area, as shown in FIG. 13.

Comparative Example 2

Figure 14:
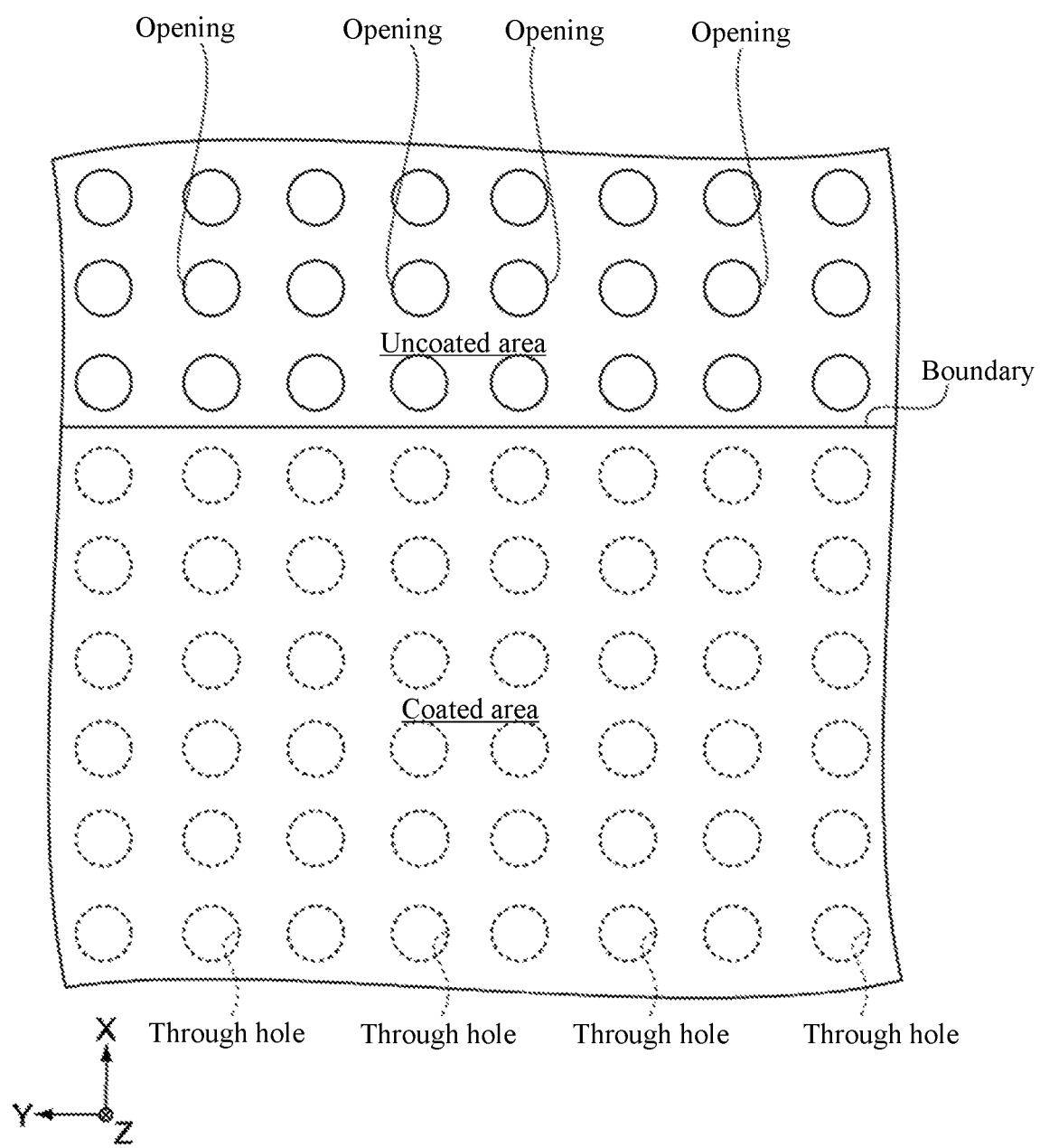
FIG. 14 is an enlarged view of the area around an end of the second negative-electrode active-material layer in the electrochemical device pertaining to Comparative Example 2 of the present invention.

FIG. 14 is an enlarged view of the area around an end of the second negative-electrode active-material layer in the sample pertaining to Comparative Example 2. The sample pertaining to Comparative Example 2 shares the same constitution with the sample pertaining to the Example, except that a copper foil having through holes arranged in a lattice pattern is adopted as the negative-electrode collector, and also that the boundary of an uncoated area and a coated area does not intersect the openings of through holes, as shown in FIG. 14.

[Characteristics Evaluation]

Next, the characteristics of the samples pertaining to the Example and Comparative Examples 1 and 2 were evaluated. To be specific, a charge/discharge test was conducted at room temperature and the direct-current resistance of each sample was checked after 50000 cycles and 100000 cycles. FIG. 15 is a table summarizing the results.

The charge/discharge conditions are as follows: charge current=1 A, CCCV=1 minute (1 A was supplied until the voltage reached the rated voltage, and once the rated voltage was reached, the rated voltage was held for 1 minute), discharge current=1 A, cutoff voltage=2.2 V.

As shown in FIG. 15, the sample pertaining to Comparative Example 1 was found to have suffered a deformation of the electric storage element and short-circuit failure when checked after 100000 cycles. The sample pertaining to Comparative Example 2 was found to have suffered a deformation of the electric storage element and excessive rise in resistance when checked after 100000 cycles.

With the sample pertaining to the Example, on the other hand, an excessive rise in resistance was suppressed and there was no deformation of the electric storage element or short-circuit failure, when checked after 50000 cycles and after 100000 cycles, as shown in FIG. 15.

The above provides an experimental proof that the electrochemical device pertaining to the embodiment herein and produced according to the aforementioned manufacturing method represents a constitution that suppresses deformation of the electric storage element during use, and consequently suppresses a short-circuit failure or excessive rise in resistance which would otherwise occur due to such deformation.

The foregoing explained an embodiment of the present invention; however, it goes without saying that the present invention is not limited to the aforementioned embodiment and various modifications can be added thereto.

For example, the aforementioned embodiment explained a wound lithium ion capacitor as an example of the electrochemical device 100; however, the present invention can also be applied to a so-called multilayer lithium ion capacitor, lithium ion battery, or the like, which has an electrode unit constituted by multiple sheet-shaped positive electrodes and negative electrodes stacked together alternately with separators in between.

In the present disclosure where conditions and/or structures are not specified, a skilled artisan in the art can readily provide such conditions and/or structures, in view of the present disclosure, as a matter of routine experimentation. Also, in the present disclosure including the examples described above, any ranges applied in some embodiments may include or exclude the lower and/or upper endpoints, and any values of variables indicated may refer to precise values or approximate values and include equivalents, and may refer to average, median, representative, majority, etc. in some embodiments. Further, in this disclosure, "a" may refer to a species or a genus including multiple species, and "the invention" or "the present invention" may refer to at least one of the embodiments or aspects explicitly, necessarily, or inherently disclosed herein. The terms "constituted by" and "having" refer independently to "typically or broadly comprising", "comprising", "consisting essentially of", or "consisting of" in some embodiments. In this disclosure, any defined meanings do not necessarily exclude ordinary and customary meanings in some embodiments.

The present application claims priority to Japanese Patent Application No. 2017-062345, filed Mar. 28, 2017, the disclosure of which is incorporated herein by reference in its entirety including any and all particular combinations of the features disclosed therein.

It will be understood by those of skill in the art that numerous and various modifications can be made without departing from the spirit of the present invention. Therefore, it should be clearly understood that the forms of the present invention are illustrative only and are not intended to limit the scope of the present invention.

We claim:

1. An electrochemical device comprising:
a positive electrode having: a positive-electrode collector made of conductive material; and positive-electrode active-material layers formed on the positive-electrode collector;
a negative electrode having: a first and second negative-electrode active-material layers; and a negative-electrode collector having: (i) a first principal face on which the first negative-electrode active-material layer is formed, and (ii) a second principal face having a coated area where the second negative-electrode active-material layer is formed, and uncoated areas, separated by the coated area, where the second negative-electrode active-material layer is not formed, wherein an area of the first principal face opposite correspondingly to the uncoated areas of the second principal face of the negative-electrode collector is a coated area where the first negative-electrode active-material layer is formed, and wherein the negative-electrode collector has multiple through holes that interconnect the first principal face and the second principal face, where a boundary of the coated area and the uncoated area of the second principal face intersects an opening of at least one of the multiple through holes;
separators that insulate the positive electrode and the negative electrode; and
an electrolyte in which the positive electrode, negative electrode, and separators are immersed;
wherein the uncoated areas of the second principal face have: (a) a first uncoated area where a metallic lithium is attached to the first uncoated area and immersed in the electrolyte, to pre-dope the first and second negative-electrode active-material layers with lithium ions, and (b) a second uncoated area where a negative electrode terminal is attached to the second uncoated area, wherein the metallic lithium is separated from the negative-electrode terminal by the coated area of the second principal face.

2. The electrochemical device according to claim 1, wherein a diameter of each through hole is 50 μm or more, but no more than 150 μm.

3. The electrochemical device according to claim 1, wherein the negative-electrode collector is made of copper.

4. The electrochemical device according to claim 1, wherein the positive electrode and negative electrode are wound together with the separators in between.

5. The electrochemical device according to claim 4, wherein an electrode on the outermost side of winding is the negative electrode, and the second principal face faces outward, wherein the first uncoated area is provided on the outermost side of winding.

6. The electrochemical device according to claim 5, wherein the first uncoated area is provided only on the outermost side of winding.

7. The electrochemical device according to claim 1, wherein the at least one of the multiple through holes is constituted by multiple through holes which are aligned along the boundary of the coated area and the uncoated area of the second principal face, and the boundary intersects the opening of each through hole aligned along the boundary about at a center of the opening.

* * * * *